June 10, 1924.
A. SCHNEIDER
1,497,307
COMBINATION TOOL HEAD FOR LATHES
Filed Aug. 24, 1921    3 Sheets-Sheet 1
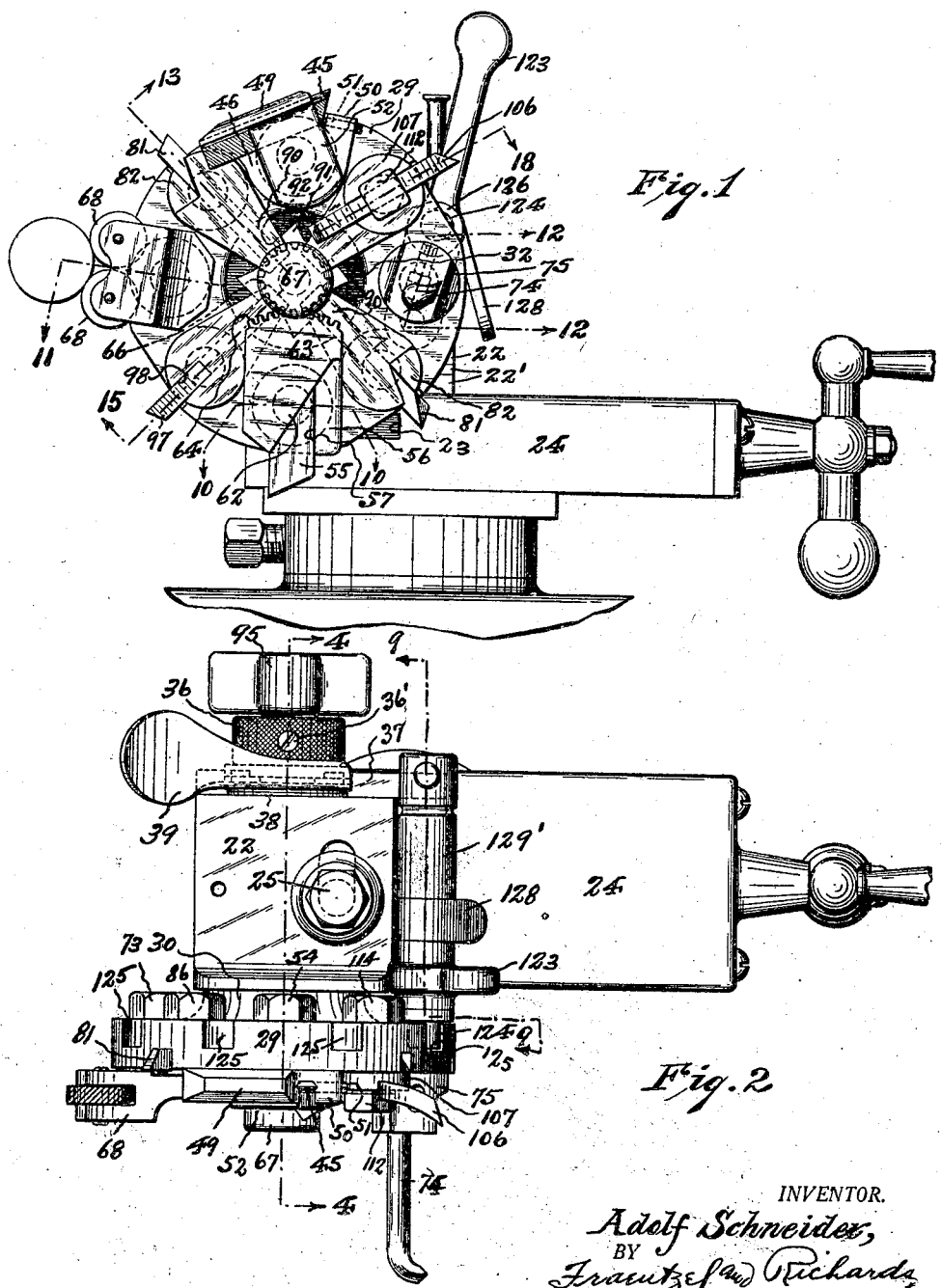
INVENTOR.
Adolf Schneider,
BY
Frautz and Richards
ATTORNEYS.

June 10, 1924.
A. SCHNEIDER
1,497,307
COMBINATION TOOL HEAD FOR LATHES
Filed Aug. 24, 1921   3 Sheets-Sheet 2
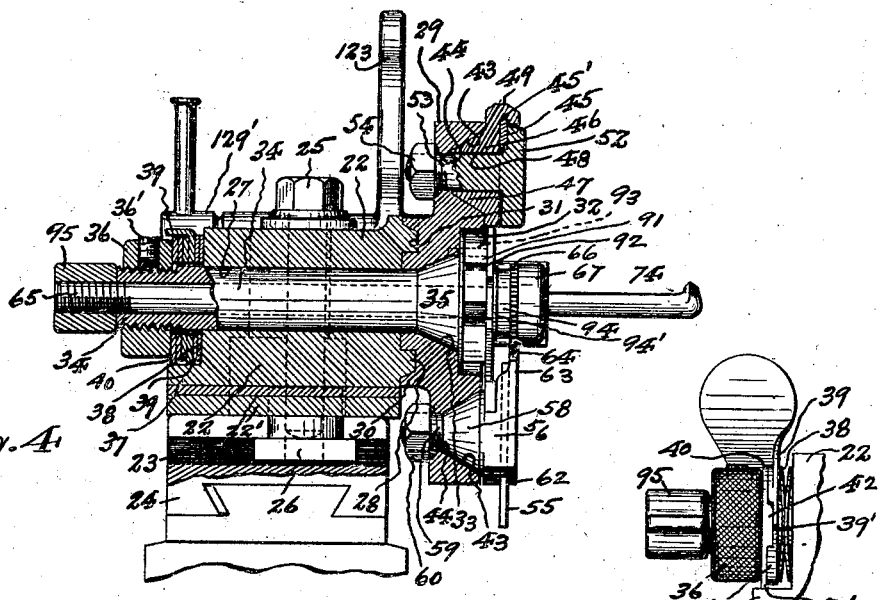
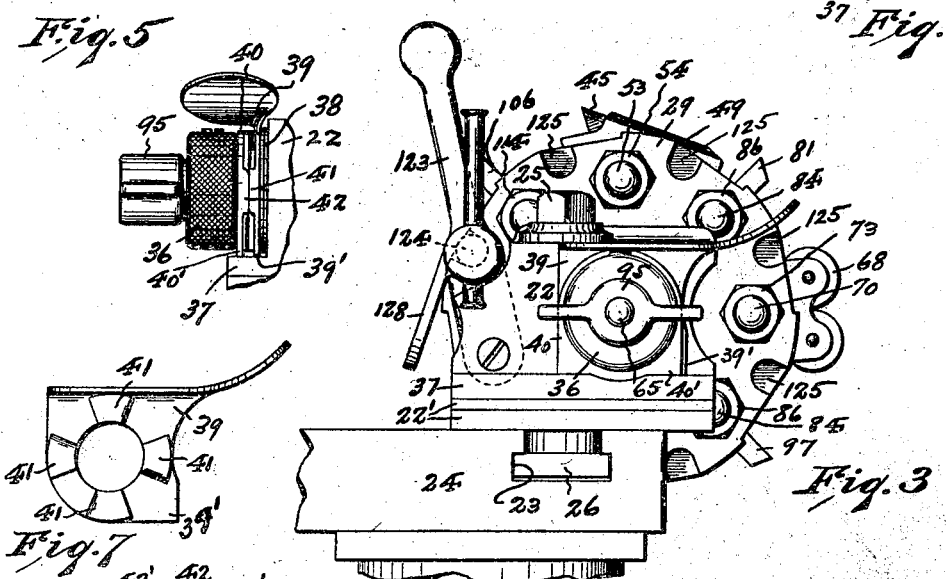
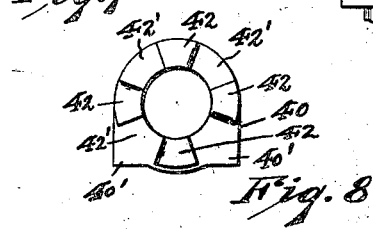
INVENTOR.
Adolf Schneider,
BY Fraentzel & Richards
ATTORNEYS.

June 10, 1924.  1,497,307
A. SCHNEIDER
COMBINATION TOOL HEAD FOR LATHES
Filed Aug. 24, 1921  3 Sheets-Sheet 3

INVENTOR.
Adolf Schneider,
BY
Frantz and Richards
ATTORNEYS.

Patented June 10, 1924.

1,497,307

UNITED STATES PATENT OFFICE.

ADOLF SCHNEIDER, OF BROOKLYN, NEW YORK.

COMBINATION TOOL HEAD FOR LATHES.

Application filed August 24, 1921. Serial No. 494,789.

*To all whom it may concern:*

Be it known that I, ADOLF SCHNEIDER, a citizen of the United States, residing at Brooklyn, in the county of Kings and State of New York, have invented certain new and useful Improvements in Combination Tool Heads for Lathes; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The invention has for its principal object to provide a novel combination tool head for holding a variety of tools, all arranged so that any desired tool may easily and quickly be brought into service position.

The invention has for a further object to provide a novel rotary carrying head for supporting the tools, and means for locking said head in desired adjusted position.

The invention further provides a novel means for making minute adjustments of the head to position the desired tool in exact accurate relation to the work.

The invention has for additional objects to provide a variety of tools for different operations, together with novel means for clamping or securing said tools to the rotary carrying head.

Other objects of this invention, not at this time more particularly enumerated, will be clearly understood from the following detailed description of the same.

With the various objects of the invention in view, the same consists, primarily, in the novel combination tool head for lathes hereinafter set forth; and, the invention consists, furthermore, in the novel arrangements and combinations of the various devices and parts, as well as in the details of the construction of the same, all of which will be hereinafter more fully described, and then finally embodied in the claims appended hereto.

The invention is clearly illustrated in the accompanying drawings, in which:—

Figure 1 is a face or front end view of the novel combination tool head, as mounted on the slide-rest of a lathe ready for service;

Figure 2 is a top or plan view of the same;

Figure 3 is a rear end view of the same; and Figure 4 is a longitudinal vertical section through the same, taken on line 4—4 in Figure 2.

Figure 5 is a fragmentary side view of the rotary carrying head locking device in operative position; and Figure 6 is a similar view of the same in released position; Figure 7 is an inner face view of the locking lever of said locking device; and Figure 8 is a face view of the thrust plate of said locking device.

Similar characters of reference are employed in all the hereinabove described views, to indicate corresponding parts.

Figure 9:
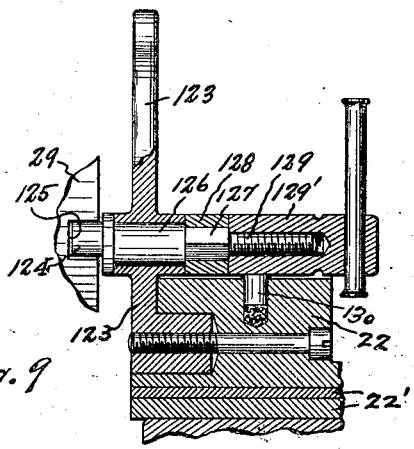
Figure 9 is a detail fragmentary vertical section, taken on line 9—9 in said Figure 2.

Referring now to said drawings, the reference character 22 indicates the main body or base of my novel combination tool head, which is adjustably secured in connection with the transverse guide-way 23 of the lathe slide-rest 24, by means of the bolt 25 and T-head nut 26. Said main body or base 22 is provided with a longitudinally disposed opening or bore 27. Connected with the forward end of said main body or base 22, so as to be disposed concentric to the axis of the bore 27, is an annular bearing rib 28.

The reference character 29 indicates a rotary carrying head, having at its rear side a hub-portion 30, in the end of which is provided an annular groove or seat 31 to receive said bearing rib 28, when said head is assembled with said main body or base 22. Said carrying head 29 is provided in its outer face with a centrally disposed counter-sunk chamber or socket 32, from the rearward end of which extends an inverted conical seat 33. Said carrying head 29 is retained in assembled relation to said main body or base 22 by means of an axial sleeve 34, which is mounted in said bore 27, and which is provided at its forward end with an inverted conical head 35 which is engaged in said inverted conical seat 33. The rearward end of said axial sleeve 34 projects outwardly beyond the rear end of said main body or base 22, and the same is threaded to receive a stop-nut 36. Said main body or base 22 is provided at its lower rearward portion with a horizontal flange 37. The locking device for locking said carrying head against rotation, comprises an annular compression spring member 38, a locking lever 39 pivoted on said axial sleeve, and a thrust plate 40 through which the axial sleeve extends. These parts are all mounted between the rear end of said main body or base 22 and said stop-nut 36 in the order above named. Said locking lever 39 is provided on its inner or rearward face with a plurality of radially disposed thrust-pieces 41, and, in like manner, said thrust-plate 40 is provided on its inner or forward face with a similar arrangement of radially disposed thrust-pieces 42. Said locking lever 39 is provided with a stop-projection 39' for engagement with said flange 37 of said main body or base, and which limits its rotary movement in an operative direction, while said thrust-plate 40 is arranged with a lower squared end 40', which engages said flange 37 of said main body or base, to prevent rotation of said thrust-plate in either direction. To hold said carrying head in a desired fixed adjusted position, secured against rotation, the locking lever 39 is turned down to normal stopped position, wherein its thrust-pieces 41 are engaged upon the thrust-pieces 42 of the thrust-plate 40, and in which position the compression spring member 38 is placed under tension, as shown in Figures 4 and 5. The tension of the spring member 38 exerts, through the intervening parts, a rearward pressure upon said stop nut 36, and therefore upon said axial sleeve 34 and its inverted conical head 35, which is in turn transmitted to said rotary head to frictionally bind the same immovably against the bearing rib 28 and forward end of the main body or base 22. The pressure or tension of the spring member, thus placed under compression, may be regulated by adjusting the stop-nut 36 on the axial sleeve, and then locking said stop-nut in the adjusted position by the set-screw 36' with which it is provided. When it is desired to release the rotary carrying head 29, so that the same may be turned to bring into service any desired selection of tool mounted thereon, the lock-lever 39 is turned upward to rotate the same whereby its thrust-pieces 41 are caused to fall in the spaces or depressions 42' intermediate the thrust-pieces 42 of said thrust-plate 40. This operation permits a longitudinal rearward movement of the locking-lever, whereby the spring member 38 is released from compression or tension, as shown in Figure 6. The tension of the spring member 38 being relaxed the pressure upon the stop-nut 36, axial sleeve 34 and its inverted conical head 35 is released; thereby releasing said rotary carrying head from frictional bound relation to said main body or base 22, and thus enabling the same to be readily turned about its axis.

Said carrying head is adapted to receive and carry, in connection with its forward face, a plurality of different kinds of lathe tools for radial projection from its perimeter, and to this end said carrying head is provided with a concentric or annular row of inverted conical seats 43 terminating in rearwardly extending openings 44 at the rear face thereof. These tools may be classified roughly into two groups, one group comprising a series of special tools for particular operations, and the other group comprising a series of cutting tools. For convenience I will first describe the special tools, and means for mounting, clamping and adjusting the same in relation to the carrying head. The reference character 45 indicates a thread cutting tool. (See more particularly Figures 1, 2 and 4.) The means for securing this tool in place comprises a holder plate 46 having at its rearward side a conical boss 47 concentric to a through opening 48. The upper edge of said holder plate 46 is provided with a grooved guide rib 49, against which the longitudinal outer edge 45' of the tool is arranged. The holder plate is provided at one side with an angularly off-set portion 50 in which is arranged an adjustable stop-screw 51 against which the operative end of the tool is engaged. This stop-screw assures the proper resetting of the tool in the holder plate, when the former has been removed for sharpening, and then returned to assembled relation with the latter. The reference character 52 indicates a clamp-plate, which has a rearwardly projecting screw-threaded shank 53, adapted to pass through the opening 48 of the holder-plate. In assembling the holder plate with the carrying head, the conical boss 47 is inserted into a conical seat 43, and the shank 53 passed rearwardly through the opening 44 extending from said seat 43, so that said shank 53 projects from the rearward face of said carrying head. A lock-nut is engaged on the rearwardly projecting end of said shank 53, and when screwed home serves to draw down into frictionally bound or clamped relation to said conical seat 43 the conical boss 47, while at the same time the clamp-plate 52 is drawn down upon the side of the tool the sides of which are preferably roughened to grip the same in bound relation to the holder-plate. It will be understood that the tool holder may be turned upon the axis of the shank 53 and conical boss 47 to adjust the angular projection of the same from the perimeter of the carrying head, as may be desired, before finally tightening the lock-nut 54 home.

Figure 10:
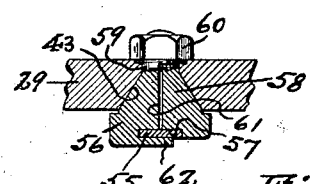
Figure 10 is a detail section, taken on line 10—10 in Figure 1, illustrating the cutting-off tool clamping or fastening device.

The reference character 55 indicates a cutting-off or parting tool. (See more particularly Figures 1, 4 and 10.) The means for securing this tool in place, comprises a holder plate 56 provided with a longitudinal seat 57 to receive the body of the tool. Integrally formed with the holder plate to project from the rearward side thereof is a conical boss 58 terminating in a rearwardly projecting screw shank 59. In assembling said holder plate upon the carrying head, the conical boss 58 is seated in a conical seat 43 so that the screw shank 59 projects through the associate opening 44 rearwardly from said carrying head. A lock nut 60 may be screwed home upon said shank 59 to draw said conical boss 58 into frictionally bound relation to said seat 43. Said holder plate and its conical boss is split longitudinally, as at 61, so that under compression, produced by binding said conical boss 58 in the seat 43, the sides of the seat 57 may be drawn together to grip the edges of the body of the tool 55 therebetween, so as to prevent longitudinal displacement thereof from the holder plate. Secured to one side portion of said holder plate, preferably as an integral part thereof, is a retaining plate 62 which overhangs a portion of said seat 57, to thereby prevent outward displacement of the tool 55 therefrom. Said retaining plate is provided at its rearward or inner end with a tail piece 63, having at its extremity a gear segment 64. Journaled in said axial sleeve 34 is a central rotary spindle 65, having adjacent to its outer end a gear member 66 fixed thereto, and with which said segment gear 64 meshes. The operative end 55' of said tool 55 extend outwardly from the forward or outer end of said holder plate 56. In order to adjust the angular projection of the operative end of the tool 55 with relation to the work, when the tool is brought into service position by a proper manipulation of the carrying head, the spindle 65 may be rotated (a finger piece 67 being provided at its free end for this purpose) to thereby turn the gear member 66, and thus transmit to said holder plate 56, through the gear segment 64, an axial movement about the axis of its conical boss 58, the lock-nut 60 being slightly loosened when such adjustment is made. Means are provided for locking the spindle and gear against rotation, after adjustment is made, and also for locking the spindle against longitudinal movement as will presently appear.

Figure 11:
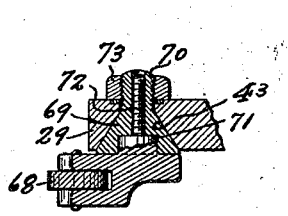
Figure 11 is a detail section, taken on line 11—11 in Figure 1, illustrating the nurling tool clamping or fastening device.

The reference character 68 indicates a nurling tool. (See more particularly Figures 1, 2 and 11.) The means for mounting this tool on the carrying head, comprises a conical block 69 terminating in a rearwardly projecting screw shank 70. Said nurling tool is provided on its rearward side with a hub 71 having a screw shank 72 of reduced diameter. Said hub is journaled in said conical block into which the screw shank 72 screws, so that said nurling tool is permitted a slight swiveling movement relative to the conical block, while at the same time it is retained against displacement from the latter. The conical block 69 is seated in a conical seat 43 so that the screw shank 70 projects through the associated opening 44 rearwardly from said carrying head. A lock nut 73 is screwed home upon said screw shank 70 to draw said conical block 69 into frictionally bound relation to said seat 43.

Figure 12:
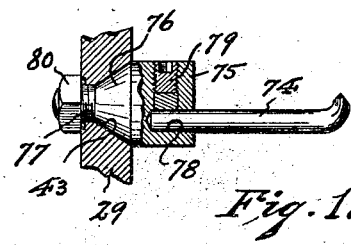
Figure 12 is a detail section, taken on line 12—12 in Figure 1, illustrating the boring tool clamping or fastening device.

The reference character 74 indicates an inside cutting or boring tool. (See more particularly Figures 1, 2, and 12.) The means for mounting this tool on the carrying head, comprises a cylindrical block 75 having a conical rear end 76 terminating in a rearwardly projecting screw shank 77. Said block 75 is provided in its forward free end with an eccentrically off-set socket 78 in which the butt of the tool is engaged. A set screw device 79 is provided for locking said tool against displacement from said socket 78. A lock-nut 80 is screwed home upon said screw-shank 77 to draw said conical rear end 76 of the block 75 in frictionally bound relation to a seat of said carrying head, as will be understood. The block may be axially turned relative to said carrying head, so as to shift the eccentrically off-set seat 78 to position the tool in desired adjusted relation to the work.

The several special tools above described are preferably arranged 90 degrees apart about the perimeter of the carrying head, and the cutting tools to be subsequently described are preferably disposed intermediate the said special tools.

Figure 13:
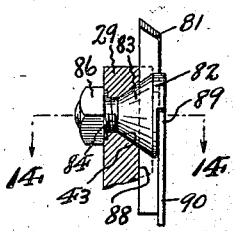
Figure 13 is a detail section, taken on line 13—13 in Figure 1, illustrating one type of cutting tool clamping or fastening device.
Figure 14:
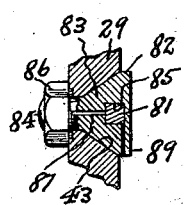
Figure 14 is a detail transverse section of the same, taken on line 14—14 in Figure 13.

The reference character 81 indicates a straight radially projecting cutting tool. (See more particularly Figures 1, 13 and 14.) The means for mounting this tool on the carrying head comprises a holder block 82 having a conical rear end 83 terminating in a rearwardly projecting screw-shank 84. Said holder block is provided with a cross channel or seat 85 to receive the body of the tool. In assembling the holder block upon the carrying head, the conical rear end 83 is seated in a conical seat 43 so that the screw-shank 84 projects through the associated opening 44 rearwardly from said carrying head. A lock-nut 86 is screwed home on said shank 84 to draw said conical head into frictionally bound relation to said seat 43. Said holder block and its conical rear end is split transversely in line with said channel or seat 85, as at 87, so that under compression, produced by binding said conical rear end in said seat 43, the sides of said channel or seat 85 may be drawn together to grip the sides of the body of the tool therebetween, so as to prevent longitudinal displacement thereof from the holder plate. The face of said carrying head is provided with a radially extending channel 88 to receive the tool, when properly associated with the holder and the carrying head. Secured to one side of said holder block, preferably as an integral part thereof, is a retaining plate 89 which overhangs a portion of said seat 85, to thereby prevent outward displacement of the tool 81 therefrom. Said plate 89 is provided with an inwardly extending tail-piece 90. Disposed in the socket 32 of the carrying head 29 is a stop block 91 having at its respective sides peripheral shoulders or off-sets 92. Said spindle 65 extends through said stop-blocks, and the latter is secured against rotary displacement relative to said carrying head by an anchor pin 93 projecting through the body thereof from said carrying head. The inner end or butt of the tool 81 is stopped against a side of said stop-block, and is also engaged against the shoulder or off-set 92 at said side, whereby the tool is braced against yielding when brought against work during its use. The said tail-piece 90 is so arranged that its free end overlaps the outer surface or face of said stop-block. Arranged on said spindle 65 next to the gear member 66 is a collar 94, and next to said collar is a copper washer 94', or washer made of other comparatively soft metal. When the tail-piece 90 is properly disposed against the face of the stop-block, the spindle 65 is drawn rearwardly by means of a wing-nut 95 arranged on its threaded rear end against the rear end of the axial sleeve 34. The tightening of said wing-nut 95 tends to draw rearwardly the spindle 65 and moves the collar 94 and washer 94' tightly against the outer surface of said tail-piece 90, to thereby firmly clamp the latter between the stop-block and washer and collar, to additionally serve in preventing any turning or rotary displacement of the holder block and the tool, so that the latter is rigidly held against all movement when in use.

Figure 15:
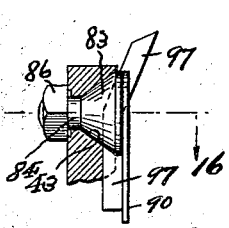
Figure 15 is a detail section, taken on line 15—15 in Figure 1, illustrating another type of cutting tool clamping or fastening device.
Figure 16:
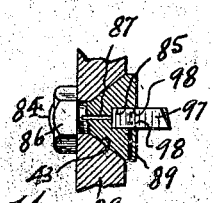
Figure 16 is a detail transverse section of the same, taken on line 16—16 in Figure 15.

The reference character 96 indicates a modified form of cutting tool, having an outwardly and angularly off-set operative end 97. This tool is adapted for cutting into angles or corners of the work operated upon. (See more particularly Figures 1, 15 and 16). The holder for this tool is substantially the same as that immediately above described, except that the retaining plate is cut-away, as at 98, adjacent to the outer end of the tool to permit of the outward angular projection of said tool from the holder.

Figure 17:
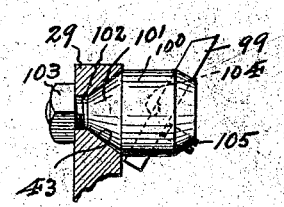
Figure 17 is a detail view illustrating another type of cutting tool clamping or fastening device.

Referring to Figure 17, I have shown another means for mounting and holding an angularly off-set tool 99. This means consists of a cylindrical holder block 100, having a conical rear end 101 terminating in a screw shank 102, and which is arranged in a socket 43 of the carrying head, and secured by a lock-nut 103. Said block 100 possesses an oblique or angularly disposed tool socket or passage 104, through which the tool extends, the tool being secured against displacement by a set screw 105 arranged in the outer end of said block.

The reference character 106 indicates a curvilinear cutting tool, for variable angular projection from its holder. (See more particularly Figures 1, 2). The means for holding this type of cutting tool and mounting the same on the carrying head, comprises, a holder plate 107 having a conical boss concentric to a through opening; said holder plate 107 being further provided with a tail-piece, whereby the clamping action against the stop-block 91 may be effected. Said holder plate 107 is provided in its outer face with a transverse concave or curvilinear seat to conform to the curve of the tool. A clamp-bolt 112 having a threaded shank to extend rearwardly through the holder plate 107 and its boss is provided. Said clamp-bolt is provided with a slot adjacent to its outer end, through which the tool 106 is passed. When the tool, holder-plate and clamp-bolt are assembled together, the conical boss of the holder plate is disposed in a conical seat 43 of the carrying head 29, so that the shank projects rearwardly through the carrying head to receive the lock-nut 114, whereby the parts are secured to the carrying head, and at the same time the clamp-bolt is drawn down to clamp the tool between the same and the holder plate. By shifting or adjusting the tool longitudinally, the operative end may be caused to project at a greater or less angle from the periphery of the carrying head. This tool is very useful for cutting in corners or angles of the work.

The several tools as secured to and combined with the rotary carrying head having been described, I will now describe, the manner of setting a desired selected tool. Assume that the operator wishes to make use of the nurling tool 68. The locking device is released by turning upward the locking lever 39, thus releasing the carrying head 29 for rotation relative to the main body or base 22. The said carrying head is thereupon turned to project said nurling tool in proper position to engage the work, and then the carrying head is locked against rotation by the locking device. It may here be mentioned that in securing the base or main body 22 to the slide-rest of the lathe, one or more shim plates 22' of varying thickness may be employed to so elevate the carrying head that its axis of rotation is approximately horizontally parallel with the axis of the work to be operated on as engaged by the lathe center points; by such means a rough adjustment of the combination tool head relative to the work is secured. After the selected tool is positioned by the above described adjustment or turning of the carrying head 29, the latter may be additionally secured against slipping or rotary displacement by a secondary locking and adjusting means. This latter means comprises a lever 123 pivoted at one side of the forward end of said main body or base 22. Carried by said lever is a forwardly projecting stud 124, which by an inward swinging of the lever is carried into one of a series of locking notches 125 provided in the periphery of the carrying head at its rearward side. In order to permit of very fine or minute up and down adjustment of the selected tool relative to the work to be operated upon, said stud 124 is mounted on a rotary member 126 journaled in said lever 123, the stud being eccentrically off-set relative to the axis of said rotary member 126, so that by turning the latter, the stud may be shifted or adjusted up or down, and consequently the rotary head 29 will be turned slightly backward or forward to depress or elevate slightly the radially projecting tool, selected for use, relative to the work. Such adjustment is preferably made while the rotary head is released, and after such adjustment is made the locking device controlled by the locking lever 39 is operated by the manipulation of the latter. The means for independently rotating said rotary member 126 to effect the desired manipulation of the stud 124, comprises a square shank 127 on the rear end of said rotary member to which is secured a lever or manipulating finger 128. Said manipulating finger 128 and the associated rotary member 126 and stud 124 may be locked against movement after adjustment by means of a lock-nut device 129' which screws upon a threaded extension 129 of the squared shank 127, and which when tightened clamps in frictionally bound relation to the main lever 123 the rotary member 126 and associated parts.

A friction device or plunger piece 130 may be employed to prevent accidental displacement of said lever 123 and its associated parts from their inwardly swung position, wherein the stud 124 is operatively engaged with the rotary carrying head 29.

The novel combination tool head, as will be evident from the above description, provides a very efficient means for mounting a variety of tools adapted to lathe operations, so that any one of the same may be selected, and quickly and easily brought into service position by simple manipulations. The tool mountings, per se, involve novel features for securely and rigidly holding the same when in working position. The device is compact and comparatively simple, and is adapted to be mounted upon the slide-rest of a lathe in place of the ordinary tool-post.

The several tools are interchangeable, and a plurality of any one type of tool may be employed, such for example as a plurality of different shapes of boring tools.

I am aware that some changes may be made in the several arrangements and combinations of the various devices and parts, as well as in the details of the construction thereof, without departing from the scope of this invention as set forth in the foregoing specification, and as defined in the appended claims. Hence, I do not limit this invention to the exact arrangements and combinations of the several devices and parts, as described in said specification, nor do I confine myself to the exact details of the construction of the said parts as illustrated in the accompanying drawings.

I claim:—

1. A combination tool head for lathes, comprising a main body having means for affixing the same to a lathe slide-rest, a carrying head rotatably associated with said main body, a series of tools, means for securing said tools to the outer face of said carrying head for substantially radial projection from the periphery thereof, a spring tension means for frictionally clamping said carrying head against rotation relative to said main body, means for actuating and releasing said spring tension means, and a secondary locking means for said rotary head, comprising a lever pivotally connected with said main body, a stud carried by said lever, and a plurality of peripheral notches in the rear side of said carrying head with which said stud may be selectively engaged.

2. A combination tool head for lathes, comprising a main body having means for affixing the same to a lathe slide-rest, a carrying head rotatably associated with said main body, a series of tools, means for securing said tools to the outer face of said carrying head for substantially radial projection from the periphery thereof, a spring tension means for frictionally clamping said carrying head against rotation relative to said main body, means for actuating and releasing said spring tension means, and a secondary locking and adjusting means for said rotary head, comprising a lever pivotally connected with said main body, a rotary member journaled in said lever, an eccentrically off-set stud projecting from the outer end of said rotary member, means for turning said rotary member relative to said lever, means for locking said rotary member in adjusted position, and a plurality of peripheral notches in the rear side of said carrying head with which said stud may be selectively engaged.

3. A combination tool head for lathes, comprising a main body having means for affixing the same to a lathe slide-rest, a tool carrying head rotatably associated with said main body, an axial member connected with said carrying head for rearward extension through said main body, a stop-nut on the free end of said axial member, a non-rotatable thrust-plate having a series of spaced radial thrust-pieces, a rotatable locking lever also having a series of spaced radial thrust pieces for cooperation with said thrust pieces of said thrust plate, and a compression spring device, said thrust plate, locking lever and compression spring device being disposed intermediate said stop-nut and the rear end of said main body, operative manipulation of said locking lever cooperating with said thrust plate to place said axial member under pressure or thrust of said compression spring device whereby said rotary head is held against rotation.

4. A combination tool head for lathes, comprising a main body having means for affixing the same to a lathe slide-rest, a tool carrying head rotatably associated with said main body, an axial member connected with said carrying head for rearward extension through said main body, a stop-nut on the free end of said axial member, a non-rotatable thrust-plate having a series of spaced radial thrust-pieces, a rotatable locking lever also having a series of spaced radial thrust pieces for cooperation with said thrust pieces of said thrust plate, a compression spring device, said thrust plate, locking lever and compression spring device being disposed intermediate said stop-nut and the rear end of said main body, operative manipulation of said locking lever cooperating with said thrust plate to place said axial member under pressure or thrust of said compression spring device whereby said rotary head is held against rotation, and a secondary locking means for said rotary head, comprising a lever pivotally connected with said main body, a stud carried by said lever, and a plurality of peripheral notches in the rear side of said carrying head with which said stud may be selectively engaged.

5. A combination tool head for lathes, comprising a main body having means for affixing the same to a lathe slide-rest, a tool carrying head rotatably associated with said main body, an axial member connected with said carrying head for rearward extension through said main body, a stop-nut on the free end of said axial member, a non-rotatable thrust-plate having a series of spaced radial thrust-pieces, a rotatable locking lever also having a series of spaced radial thrust pieces for cooperation with said thrust pieces of said thrust plate, a compression spring device, said thrust plate, locking lever and compression spring device being disposed intermediate said stop-nut and the rear end of said main body, operative manipulation of said locking lever cooperating with said trust plate to place said axial member under pressure or thrust of said compression spring device whereby said rotary head is held against rotation, and a secondary locking and adjusting means for said rotary head, comprising a lever pivotally connected with said main body, a rotary member journaled in said lever, an eccentrically off-set stud projecting from the outer end of said rotary member, means for turning said rotary member relative to said lever, means for locking said rotary member in adjusted position, and a plurality of peripheral notches in the rear side of said carrying head with which said stud may be selectively engaged.

6. A combination tool head for lathes, comprising a rotary carrying head, means for mounting said head, means for holding said head against rotation, a series of tools, means for securing said tools to the outer face of said carrying head for substantially radial projection from the periphery thereof, and a secondary locking means for said rotary head, comprising a pivoted lever, a stud carried by said lever, and a plurality of peripheral notches in the rear side of said carrying head with which said stud may be selectively engaged.

7. A combination tool head for lathes, comprising a rotary carrying head, means for mounting said head, means for holding said head against rotation, a series of tools, means for securing said tools to the outer face of said carrying head for substantially radial projection from the periphery thereof, and a secondary locking and adjusting means for said rotary head, comprising a pivoted lever, a rotary member journaled in said lever, an eccentrically off-set stud projecting from the outer end of said rotary member, means for turning said rotary member relative to said lever, means for locking said rotary member in adjusted position, and a plurality of peripheral notches in the rear side of said carrying head with which said stud may be selectively engaged.

8. A combination tool head for lathes, comprising a main body, a tool carrying head rotatably associated with said main body, a lever pivotally mounted on said main body adjacent to the rear of and toward one side of said carrying head, a forwardly projecting stud carried by said lever, and a plurality of peripheral notches in the rear side of said carrying head with which said stud may be selectively engaged.

9. A combination tool head for lathes, comprising a main body, a tool carrying head rotatably associated with said main body, a lever pivotally mounted on said main body adjacent to the rear of and toward one side of said carrying head, a rotary member journaled in said lever, an axially offset forwardly projecting stud connected with the forward end of said rotary member, means for turning said rotary member, means for locking said rotary member against turning, and a plurality of peripheral notches in the rear side of said carrying head with which said stud may be selectively engaged.

10. The combination with a rotary carrying head and means for mounting the same, of a plurality of cutting tools, and means for holding said cutting tools rigidly secured for substantially radial projection from the periphery of said carrying head, each holding means comprising a split holder member having a conical rear boss terminating in a screw shank, a tool seat, and a retaining plate overlapping said tool seat, and said carrying head having a conical seat to receive the conical boss of each holder member, a lock nut engageable on said screw shank to secure the holder member to said carrying head and in operatively clamped relation to said tool, a tail-piece connected with said retaining plate, and means associated with said carrying head for engaging and gripping said tail-piece to secure said holder member against rotary displacement relative to said carrying head.

In testimony that I claim the invention set forth above I have hereunto set my hand this 19th day of August, 1921.

ADOLF SCHNEIDER.

Witnesses:
ADOLPH HANSEN,
GEORGE D. RICHARDS.